Aug. 19, 1924.
J. M. IRVING
1,505,894
VEHICLE SUPPORT
Filed Jan. 5, 1924    2 Sheets-Sheet 1
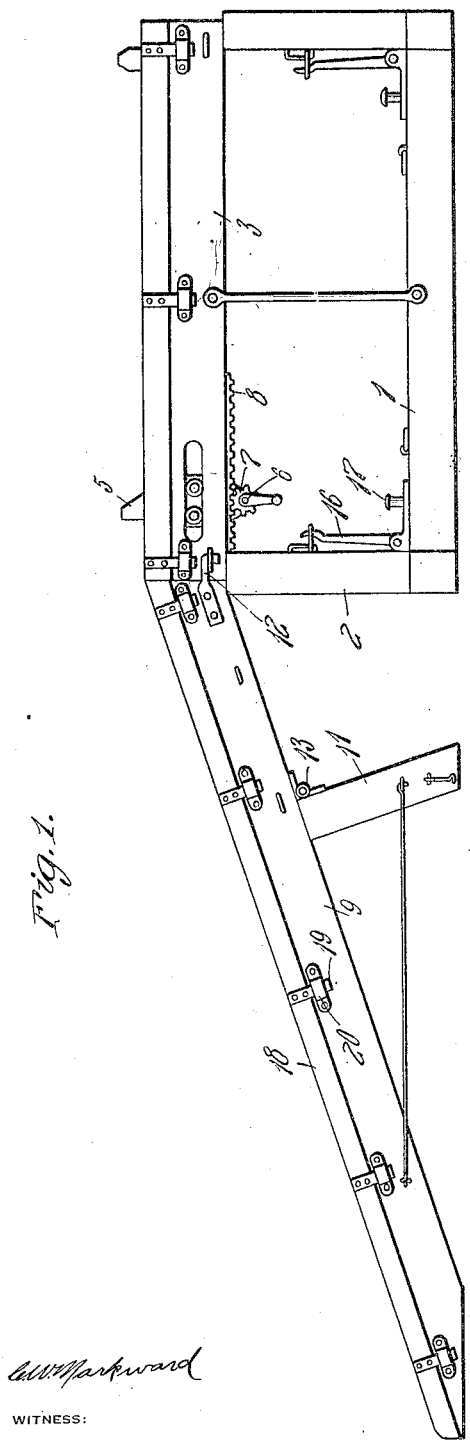
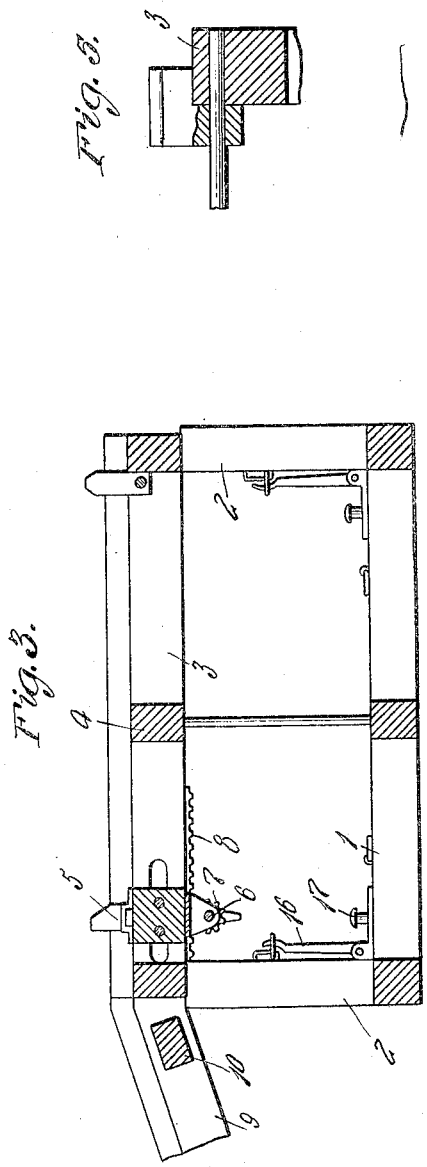
J. M. Irving
INVENTOR
BY Victor J. Evans
ATTORNEY
WITNESS:

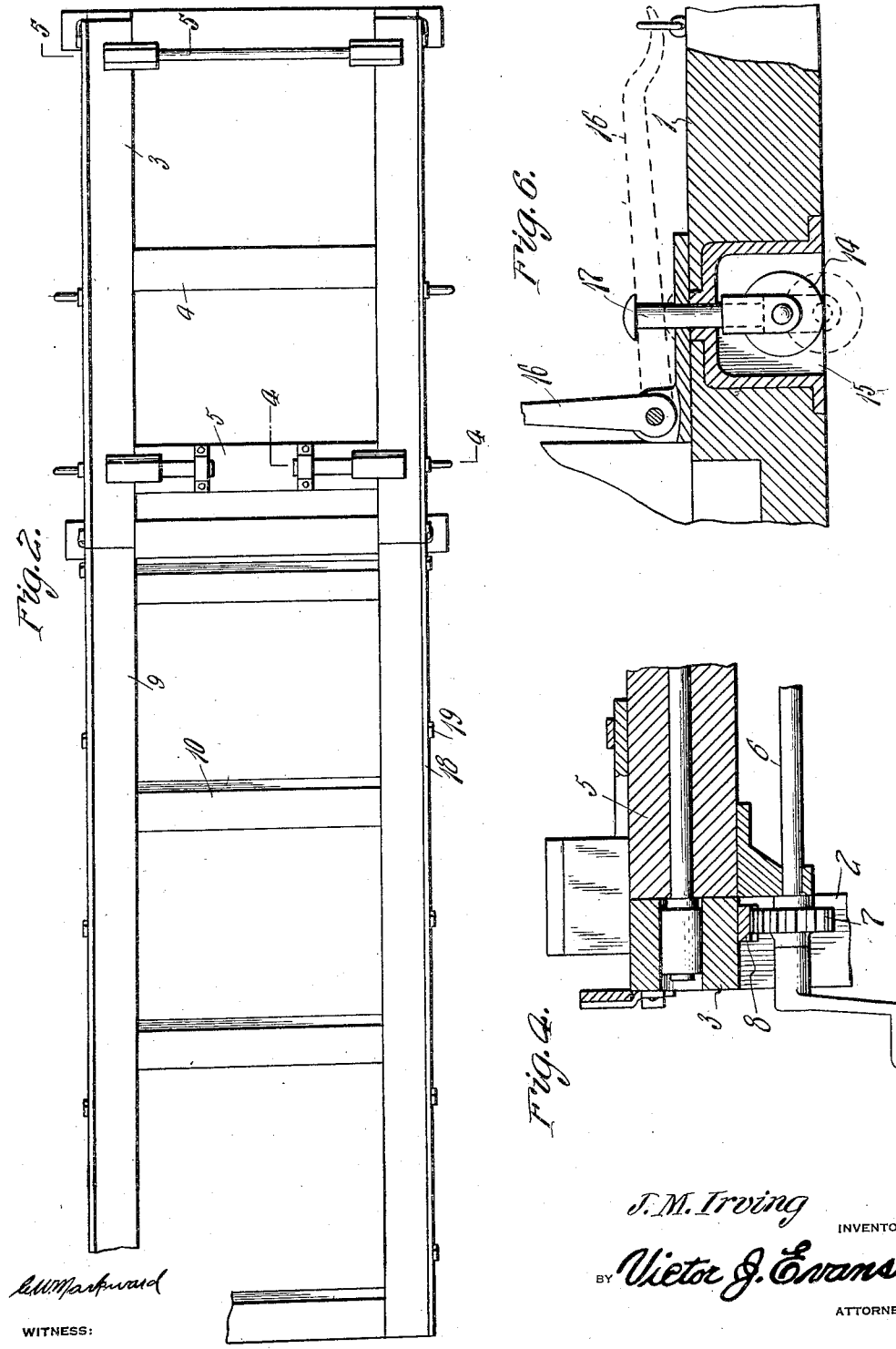

Patented Aug. 19, 1924.

1,505,894

UNITED STATES PATENT OFFICE.

JOSEPH M. IRVING, OF BRADFORD, MASSACHUSETTS, ASSIGNOR OF ONE-HALF TO EMMA E. BARD, OF BRADFORD, MASSACHUSETTS.

VEHICLE SUPPORT.

Application filed January 5, 1924. Serial No. 684,613.

*To all whom it may concern:*

Be it known that I, JOSEPH M. IRVING, a citizen of the United States, residing at Bradford, in the county of Essex and State of Massachusetts, have invented new and useful Improvements in Vehicle Supports, of which the following is a specification.

This invention relates to a supporting device for motor vehicles, the general object of the invention being to provide means for holding a vehicle off the floor so that a workman can easily reach the parts underneath the same in repairing and greasing the vehicle.

Another object of the invention is to provide means for making the device portable and for chocking the vehicle on the device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the device.

Figure 2 is a plan view.

Figure 3 is a longitudinal sectional view.

Figure 4 is a section on line 4—4 of Figure 2.

Figure 5 is a section on line 5—5 of Figure 2.

Figure 6 is a detail view.

In these views, 1 indicates a lower frame to which the corner posts 2 are connected. The top frame, supported by the posts 2 comprises the side beams 3, the stationary cross piece 4 and the movable cross piece 5. This piece 5 is movable by the crank shaft 6 which has the gears 7 thereon engaging the racks 8 on the side beam. Thus the cross piece is adjusted by turning the crank shaft. A runway consisting of the two inclined beams 9 connected together by the cross pieces 10 and supported by the legs 11 has its upper end resting upon the projecting portions of the posts 2, at the front end of the frame 1. The runway is fastened to the upper frame by the latching means 12 and the posts 11 are hingedly connected with the runway, as shown at 13. Casters 14 are carried by the lower frame and these casters normally occupy recesses 15 in the frame so that they do not engage the floor. When it is desired to make the casters engage the floor they are pressed downwardly by the levers 16 engaging the shanks 17 of the casters. The runway can be used at either end and it has a guard 18 on each side rail thereof. These can be removed as they have extensions 19 engaging sockets 20 in the side pieces. By making the cross piece 5 adjustable, the device can be used with different sizes of vehicles. The cross piece is adapted to be placed under the axles of the vehicles for the purpose of setting jacks. The casters provide means for moving the device from place to place and after the device has been moved to its proper place, by moving the casters upwardly into the recesses, there is no danger of the device moving, as it will set solidly on the floor. The runway permits the vehicle to be run upon the device under its own power or pushed up. This device will enable a workman to easily get at the parts of the vehicle under the same.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described, comprising a frame, including a pair of upper side pieces, a stationary cross piece and a movable cross piece, a crank shaft, gears thereon and racks on the side piece engaged by the gears for adjusting the cross piece.

In testimony whereof I affix my signature.

JOSEPH M. IRVING.